SINGLE-RAIL MOSFET MEMORY WITH CAPACITIVE STORAGE

Filed May 16, 1969 5 Sheets-Sheet 1

INVENTOR.
SVEN E. WAHLSTROM
BY
Mellin, Moore & Weissenberger
ATTORNEYS

INVENTOR.
SVEN E. WAHLSTROM
BY
Mellin, Moore & Weissenberger
ATTORNEYS

SINGLE-RAIL MOSFET MEMORY WITH CAPACITIVE STORAGE

Filed May 16, 1969 5 Sheets-Sheet 3

INVENTOR.
SVEN E. WAHLSTROM
BY
Mellin, Moore + Weissenberger
ATTORNEYS

INVENTOR.
SVEN E. WAHLSTROM
BY
Mellin, Moore & Weissenberger
ATTORNEYS

INVENTOR.
SVEN E. WAHLSTROM
BY
Mellin, Moore & Weissenberger
ATTORNEYS

United States Patent Office 3,533,089
Patented Oct. 6, 1970

3,533,089
SINGLE-RAIL MOSFET MEMORY WITH CAPACITIVE STORAGE

Sven E. Wahlstrom, Palo Alto, Calif., assignor to Shell Oil Company, New York, N.Y., a corporation of Delaware Filed May 16, 1969, Ser. No. 825,257
Int. Cl. G11c *11/40*; H03k *3/28*
U.S. Cl. 340—173 6 Claims

ABSTRACT OF THE DISCLOSURE

A read/write memory can be constructed with a single active element per bit—a structure usually associated only with read-only memories—by using, for each bit, a MOSFET which can be addressed to store a one or zero on one of its electrode capacitances. During the read operation, the stored charge on the addressed bit MOSFET is read by discharging electrode capacitance into the bit line capacitance to produce a capacitive potential in the bit line. This potential can be read by a read amplifier. Inasmuch as this type of reading is destructive, the information must be restored following reading before the next bit can be addressed. Due to the leakage of the capacitive charge, all bits have to be cyclically read and restored even though the information derived from the reading is not used. Various topologies can be used to develop the storage capacitance between an isolated P region and the grounded bulk material or a grounded line.

BACKGROUND OF THE INVENTION

Double-rail MOSFET (Metal Oxide Silicon Field Effect Transistor) memory systems have previously been proposed. A typical example of such a device is the one shown at page 52 of the June 10, 1968 issue of Electronic Design News (EDN) article entitled "Multi-phase Clocking Achieves 100 Nanosecond MOS Memory." In this device, memory storage is achieved by charging one of the bit line capacitances and discharging the other. This type of circuit requires six MOSFETs per bit, and it is fairly complex. Circuitry which employs only one MOSFET per bit has been used in read-only memories, in which those bits which are to be kept at the logic "1" level have their gates connected to the Y address line, and all devices are connected between a power source and the X address line. In this configuration, when a read pulse is applied to the selected Y line, an appropriate readout will appear in the selected X line, this readout being "1" if the selected bit is connected to the Y line and "0" if it is not.

In the silicon-chip type of microminiaturized integrated circuit technology, the cost per bit is inversely proportional to the chip area required per bit. Therefore, it is highly desirable to reduce the number of MOSFETs and other components per bit required for a memory. The ultimate condition is, consequently, a single MOSFET per bit which serves both as the gating element and as the storage element, and this is the aim of this invention.

SUMMARY OF THE INVENTION

In accordance with the invention, a selected Y address enables each bit MOSFET with that Y address and thereby connects the storage capacitor for that bit to the bit line corresponding thereto. In the preferred embodiment of a word-oriented array, the X address enables all the bit lines with that X address by connecting them to the common read amplifiers, of which there are as many as there are bits per word. During a read pulse (i.e. a first-phase clock pulse) any charge stored in the capacitor of the selected bit is transferred into the bit line capacitance. This charge transfer produces a small voltage in the bit line which the read amplifier connected thereto senses as an information signal voltage. The output of the read amplifier is then fed to a flip-flop which stores the read indication and writes it back onto the bit storage capacitance through the same line, and by essentially the same process in reverse, when the restoring gate is enabled by an appropriate second-phase clock pulse. The restoring signal can be overridden by a write signal when it is desired to write new information. A third-phase clock is provided to discharge the bit lines between restoration and reading so as to preset the bit lines to receive information. The third-phase clock also resets the flip-flop.

It is the object of this invention to provide a random-access MOSFET read/write memory having essentially only one MOSFET per bit.

It is a further object of this invention to accomplish the aforesaid objective by storing digital information in the capacitance associated with each individual bit MOSFET.

It is a further object of this invention to provide a chip construction in which the storage capacitances for the above said purposes can be conveniently formed as part of the bit MOSFETs themselves.

It is yet another object of the invention to provide a chip topology which reduces the bit line capacitance to a minimum.

DESCRIPTION OF THE PREFERRED EQUIPMENT

The concept of information storage by impressing a charge on a capacitance through an active element, and then retrieving that charge through the active element at an appropriate time, is well known as such. This concept is very useful in the field of integrated circuit technology because it permits the construction of memory arrays from MOSFETs (metal oxide silicon field effect transistors), of which hundreds and even thousands can be placed on a single silicon chip together with their associated circuitry.

Microminiaturized integrated circuits of the silicon-chip type, however, have some pecularities which make the application of the capacitive storage concept quite difficult. Specifically, the microscopic size of the components involved makes it imperative that the capacitances be formed on the chip as part of, or at least in immediate proximity to, the MOSFETs with which they are associated. The capacitance of capacitors which can be produced in such a location and in the size compatible with the size of the MOSFETs themselves is, however, quite small; and as a practical matter, the inherent capacitance of the leads or lines which connect individual bit MOSFETs together is far greater than the capacitance of the individual capacitors which can be formed in conjunction with each MOSFET.

Fortunately, it is not necessary that the capacitance of the storage capacitors be even nearly comparable to the capacitance of the line capacitances. If the reading and writing operations can be accomplished by the transfer of incremental charges from the storage capacitors to the line capacitances and back, then the line will show a slight change in potential which can be recognized by a readout amplifier.

Taking advantage of this fact, the present invention provides for forming, as part of the MOSFET itself, a capacitor of just sufficient capacitance so that the transfer of its charge into the line capacitance produces a detectable potential in the line. FIGS. 1–5 show preferred physical structures capable of carrying out this concept.

Figure 1:
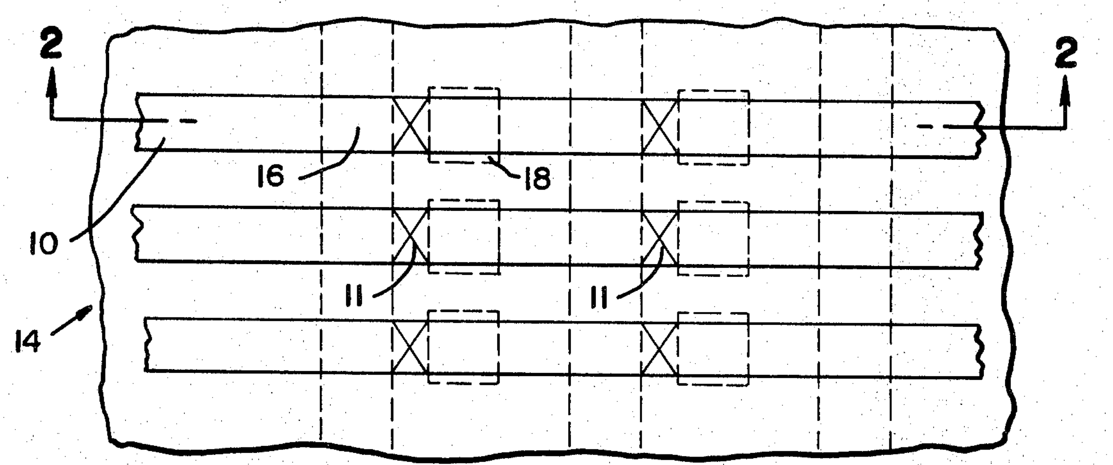
FIGS. 1 and 2, respectively, are plan and sectional views of a portion of a memory chip constructed in accordance with the invention showing one preferred method of forming the storage capacitance.
Figure 2:
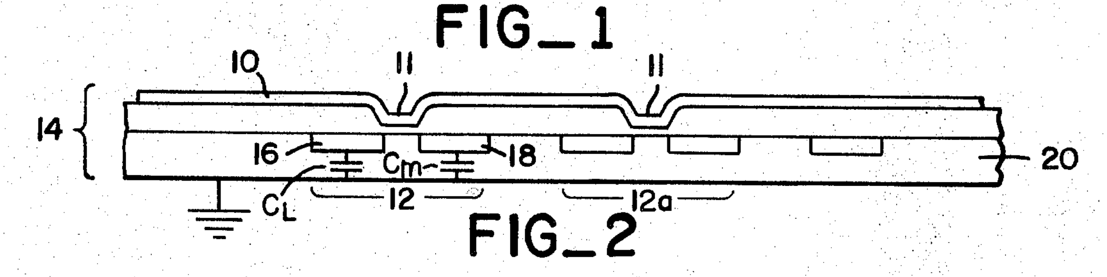
Figure 3:
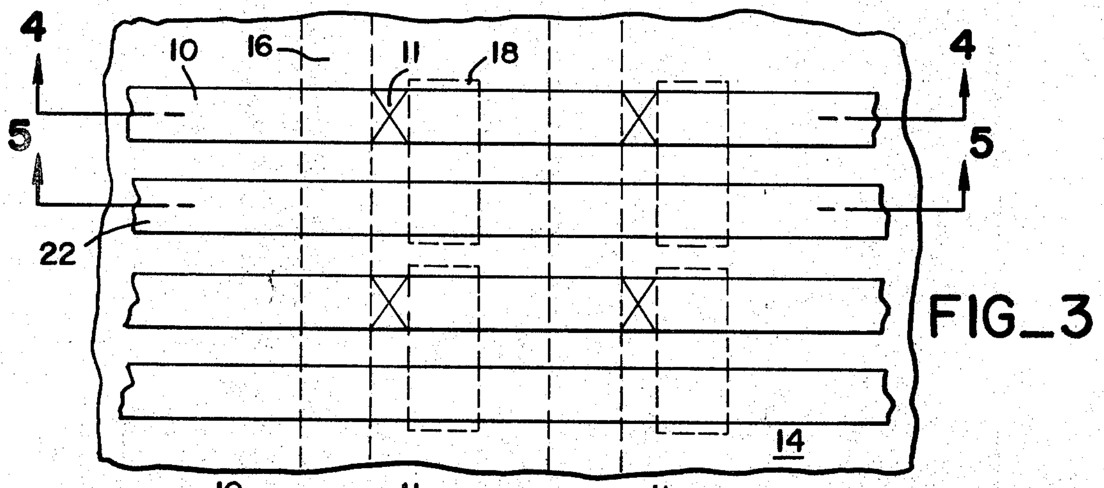
FIGS. 3 and 4, 5 are views similar to FIGS. 1 and 2 but showing another preferred method of forming the storage capacitances.
Figure 4:
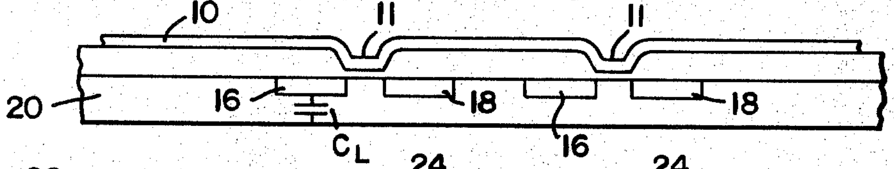
Figure 5:
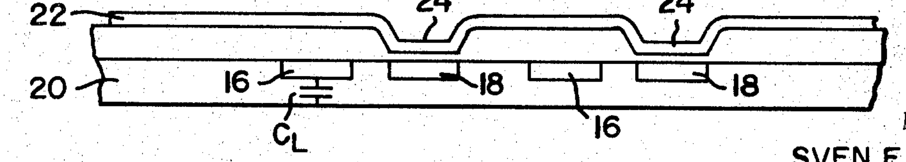

In the cross-sectional view of FIG. 1, 10 may represent, for example, a Y line such as the metallic conductor which constitutes the gate electrodes 11 of MOSFETs 12, **12*a* formed on silicon chip 14. The drain electrode of the MOSFET 12 consists of the P region 16, which is common to MOSFETs 12, 112, and 212 and which forms the bit line common to these MOSFETs. The source electrode consists of a P region 18 associated only with MOSFET 12. To form the storage capacitance $C_m$, the P region 18 which constitutes the source electrode of MOSFET 12 is simply left unconnected. The capacitance $C_m$ then consists of the capacitance between the isolated P region 18 and the grounded substrate 20**.

If the isolated P region 18 is of sufficient size, the capacitance $C_m$ thus formed is often sufficient. However, if it is not, its capacitive value can be increased considerably by the topology shown n FIGS. 3–5. In those figures, an additional ground line 22 is provided between each of the Y lines 10. The P region 18 is then enlarged in a direction transverse to the Y line 10 and ground line 22. Where it overlies the P region 18, the ground line 22 is brought close to the P region 18 (with only an oxide layer of gate insulation thickness separating them), as best shown at 24 in FIG. 5. The oxide layer 26 constitutes the dielectric of the capacitor formed by P region 18 and ground line 22.

With this construction, it is possible to obtain a capacitance $C_m$ of sufficient size so that transfer of the energy stored therein to the bit line 16 will impart a sufficient potential to the bit line capacitance $C_L$ (FIGS. 2, 4, 5, and 6) to produce a readable output. The manner in which this principle is applied to an actual memory array is basically illustrated in FIG. 6. In that figure, 30, 32, 34 denote three Y address lines of an array which may have any desired number of Y address lines. Likewise, 38, 40, 42, 44 designate four bit address lines, which may correspond to the bits of a set of four-bit words having a common X address. Each bit-Y address in the array is associated with one specific MOSFET, such as MOSFET 12 associated with the address 30, 38.

The addressing of Y line 30 by an appropriate Y address pulse causes MOSFETTs 12, **12*a*, 12*b* and 12*c* to be gated. As will be noted from FIG. 9, that initiation of any address comes at a time when all bit lines have been reset to logic "0." Consequently, assuming that the bit of MOSFET 12 is in a "1" memory condition (e.g. with its $C_m$ charged to $-5$ volts), and that the bits of MOSFETs 12*a*, 12*b*, and 12*c* are in a "0" condition (i.e. with no charge on their $C_m$s), a charge will be transferred from the $C_m$ of MOSFET 12 into the bit line capacitance $C_L$ of bit line 38. No charge will be transferred to the line capacitances $C_L$ of bit lines 40, 42, and 44**.

Due to the relative values of capacitances of $C_m$ and $C_L$, the 5-volt charge of $C_m$ discharging through MOSFET 12 upon occurrence of the $Y_{30}$ address pulse produces a negative potential in the bit line 38. During the first-phase clock or read pulse $\phi_1$ (FIG. 9), which gates read gate 46, this potential is sensed by the read amplifier 50, and a "1" indication is transmitted to the storage element 52 by the read amplifier 50. It will be understood that each bit line has its own information processing circuitry 54, only one set of which is shown for clarity.

Figure 9:
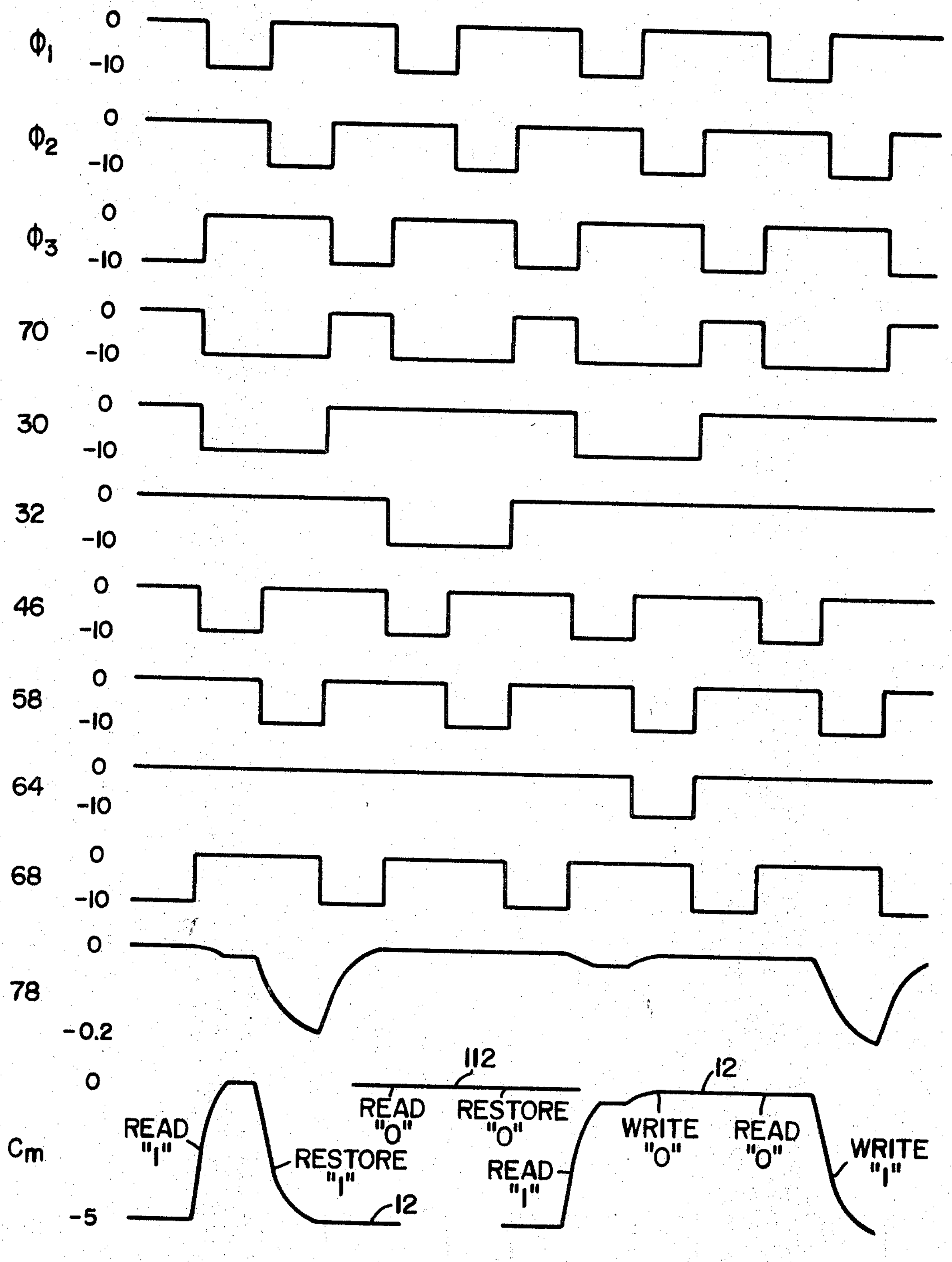
FIG. 9 is a graphical representation of the waveforms appearing at various points in the circuit of FIG. 7.

Inasmuch as the addressing of MOSFETs 12, **12*a*, 12*b* and 12*c* has destroyed the information therein, the information must now be restored. For this purpose, the "1" indication stored in flip-flop 52, which appears in the data output line 56, is applied to the bit line 38 through restore gate 58 during the second-phase clock or write pulse $\phi_2$ (FIG. 9). The magnitude of the restoring signal (if it is a "1") is sufficient to drive the bit line 38 to a potential at which the $C_m$ of MOSFET 12 becomes fully recharged. No potential was produced during the read pulse on bit lines 40, 42, 44 due to the "0" condition of bits 12*a*, 12*b* and 12*c*. Hence, the flip-flops associated with these bit lines produce no output during the write pulse, and bit lines 40, 42 and 44** remain at ground level.

If it is desired to write into bit 12 instead of restoring it, the write gate 64 is enabled during the second phase $\phi_2$ connecting the bit line to an outside low impedance data source 66. The gate 58 is not enabled during $\phi_2$ when writing takes place. At the end of $\phi_2$, the bit line and the selected memory capacitor $C_m$ are charged to the potential of the data source.

It will be noted that $C_m$ cannot be charged without also charging $C_L$. Consequently, a third clock phase $\phi_3$ (FIG. 9) must be provided to discharge $C_L$ after all memory MOSFETs are blocked. This is done by using $\phi_3$ to gate the grounding gate 68. The operation of grounding gate 68 prior to each read pulse $\phi_1$ assures that all bit lines are at ground and are ready to receive informational charges from the addressed memory bits.

Like all physical capacitances, the capacitances $C_m$ are subject to leakage discharge and hence to gradual loss of information. Consequently, all bits of the memory must be periodically exercised to refresh the information stored therein, a matter which can be accomplished by appropriate programming.

Figure 6:
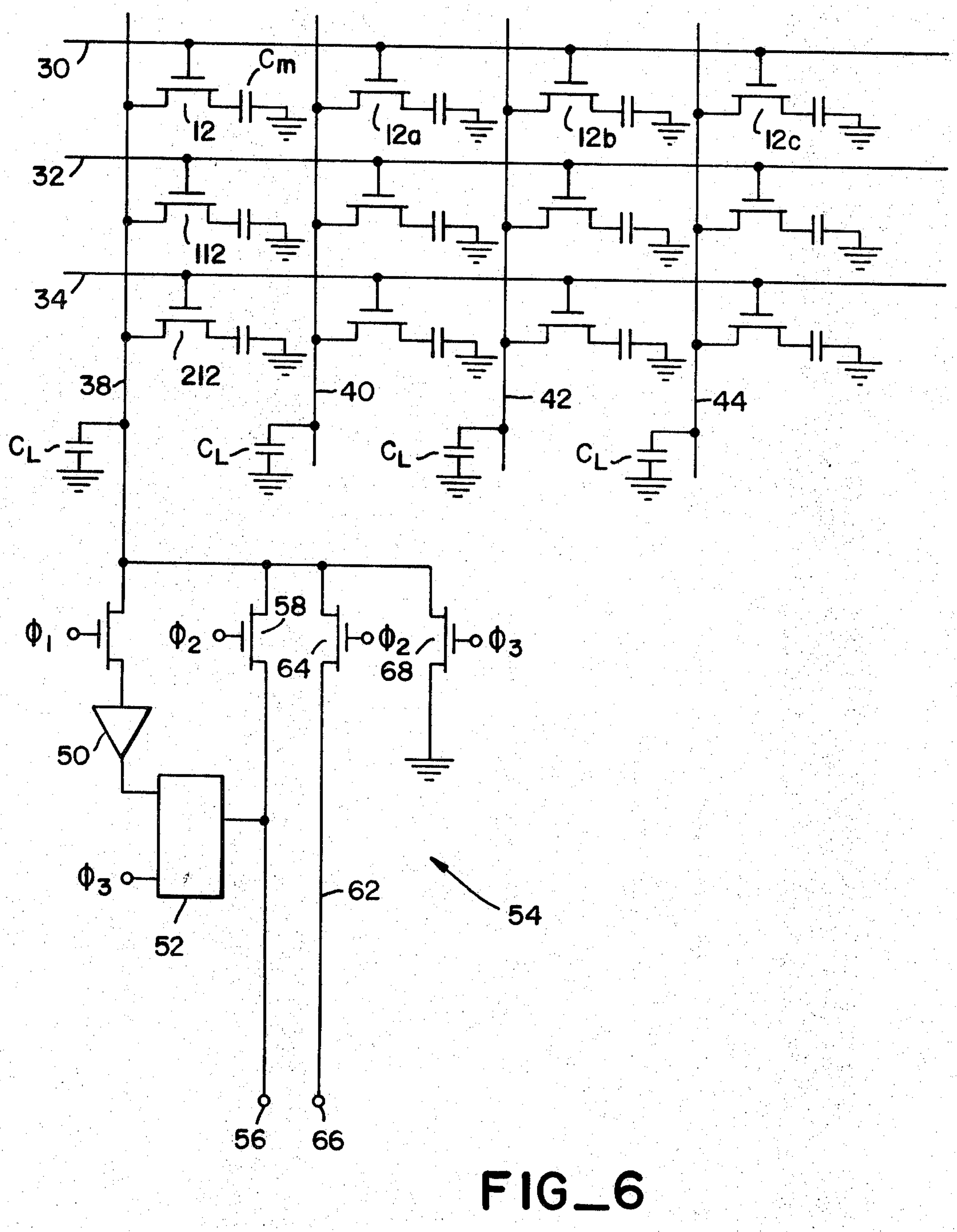
FIG. 6 is a diagrammatic representation showing the basic operation of the memory of this invention.
Figure 7:
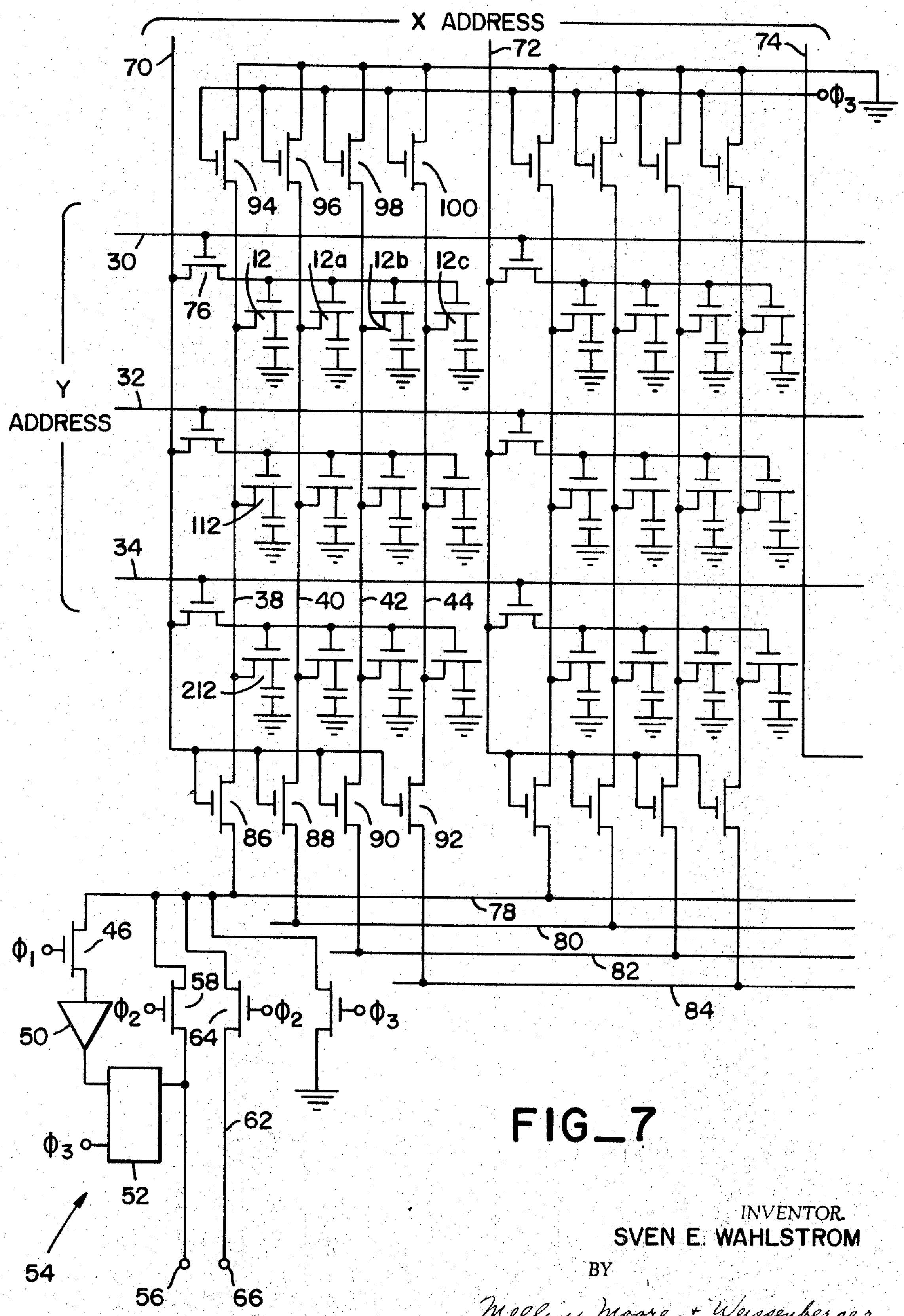
FIG. 7 is a circuit diagram showing an array constructed in accordance with this invention, together with its address and bit line pre-set gates.
Figure 8:
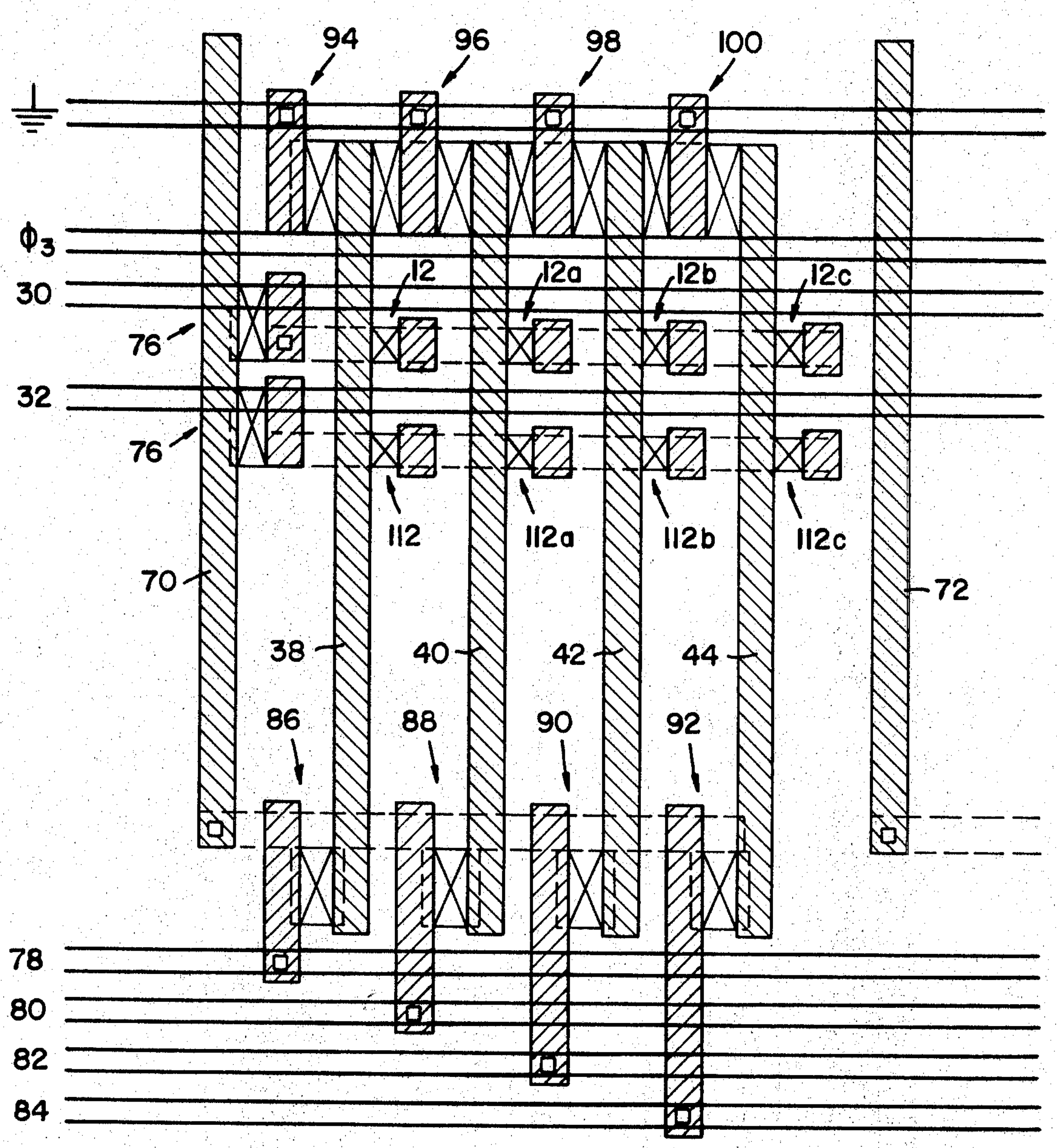
FIG. 8 illustrates a preferred topology of the circuit of FIG. 7.

FIGS. 7 and 8 show a typical word-oriented memory array embodying the concepts of this invention. The Y address appears on Y lines 30, 32, 34 and the X address appears on X lines 70, 72, 74. The coincidence of a given pair of X and Y addresses operates the word selector gate 76 corresponding thereto. The selector gate 76 in turn enables the memory MOSFETs 12, **12*a*, 12*b*, 12*c* of the selected word in the manner discussed in connection with FIG. 6 above. The information obtained from the addressed bits is transferred to bit lines 38, 40, 42, 44 which are connected to the common bit lines 78, 80, 82, 84 by the X-address-operated gates 86, 88, 90 and 92** respectively for a purpose hereinafter described.

The reading, writing, restoring and presetting circuitry of FIG. 7 is the same as that of FIG. 6. However, if the X address, like the Y address, is to be present only during the $\phi_1$ and $\phi_2$ clock times, additional presetting gates 94, 96, 98, 100 are required to discharge the individual bit lines 38, 40, 42, 44.

FIG. 8 shows a preferred topology for the circuit of FIG. 7. It will be noted that this topology, in providing for X-address gating between the individual bit lines 38, 40, 42, 44 and the common bit lines 78, 80, 82, 84, respectively, reduces the $C_L$ to be charged by each bit $C_m$ to the $C_L$ of one individual bit line plus the $C_L$ of one common bit line. This reduction of $C_L$ allows the use of the topology of FIGS. 1 and 2 for the individual bits, and dispenses with the necessity for the ground lines of FIGS. 3–5.

FIG. 9 shows the waveforms occurring at the indicated points in the circuit of FIG. 7 in their proper time relationship, and is illustrative of the charge transfer processes involved.

I claim:

1. A clock-operated random access MOSFET read/write memory array, comprising:

(a) for each bit, a single MOSFET having an information storage capacitance integrally formed therewith;

(b) bit line means connecting one of the electrodes of the source-drain circuit of a plurality of said bit MOSFETs;

(c) information processing circuitry including information sensing means; means for preserving sensed information and producing a restoring signal in accordance with said sensed information; and data input and output means;

(d) multi-phase clock pulse generating means;

(e) read gate means operated by first-phase clock pulses to connect said sensing means to said bit line means;

(f) restore gate means operated by second-phase clock pulses to connect said restoring-signal-producing means to said bit line means;

(g) write gate means operated by second-phase clock pulses to connect said data input means to said bit line means;

(h) preset gate means operated by third-phase clock pulses to connect said bit line means to a fixed potential; and (i) address means arranged to gate selected ones of said bit MOSFETSs into conduction during said first-phase and second-phase clock pulses.

2. The device of claim 1, in which said fixed potential is ground.

3. The device of claim 1, in which said bits are arranged in a word-oriented array, and said address means are energized by word selection gate means responsive to the coincidence of a specific combination of X and Y address pulses.

4. The device of claim 3, in which siad bit lines are individual bit lines common only to those bits which have the same X address; said information processing circuitry is connected to a common bit line; and said X address pulses operate bit line gate means for connecting only the individual bit line of the selected word to said common bit line, so as to reduce the line capacitance of the bit line connected to an addressed bit.

5. The device of claim 2 wherein said bit MOSFETs are of the PNP type on a grounded substrate and said information storage capacitance is the capacitance between the other of the drain-source circuit electrodes of each bit MOSFET and the grounded substrate.

6. The device of claim 4 wherein all elements other than said multi-phase clock pulse generating means are integrated onto a common grounded N type substrate, said fixed potential is ground and said information storage capacitance is the capacitance between the other of the drain-source circuit electrodes of each bit MOSFET and the grounded substrate.

References Cited

UNITED STATES PATENTS

| | | | |
|---|---|---|---|
| 3,365,707 | 1/1968 | Mayhew | 340—173 |
| 3,373,295 | 3/1968 | Lambert | 340—173 |
| 3,387,286 | 6/1968 | Dennard | 340—173 |
| 3,435,138 | 3/1969 | Borkan | 340—173 |
| 3,478,323 | 11/1969 | Rado | 340—173 |

TERRELL W. FEARS, Primary Examiner

U.S. Cl. X.R.

307—279